May 2, 1944.     G. E. DATH     2,347,889
QUICK TAKE-UP MECHANISM
Filed Sept. 10, 1942     2 Sheets-Sheet 1
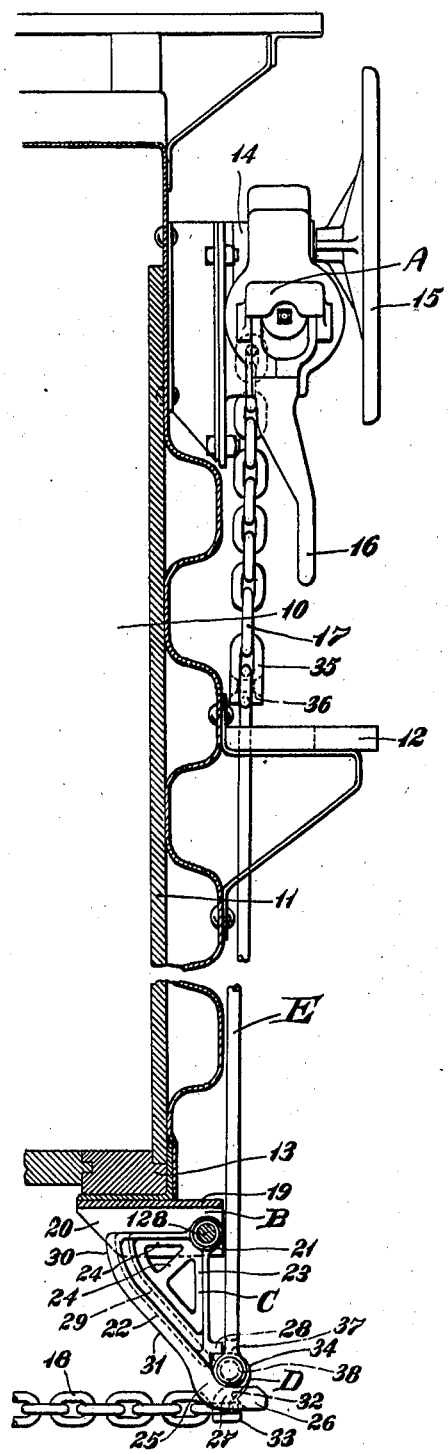
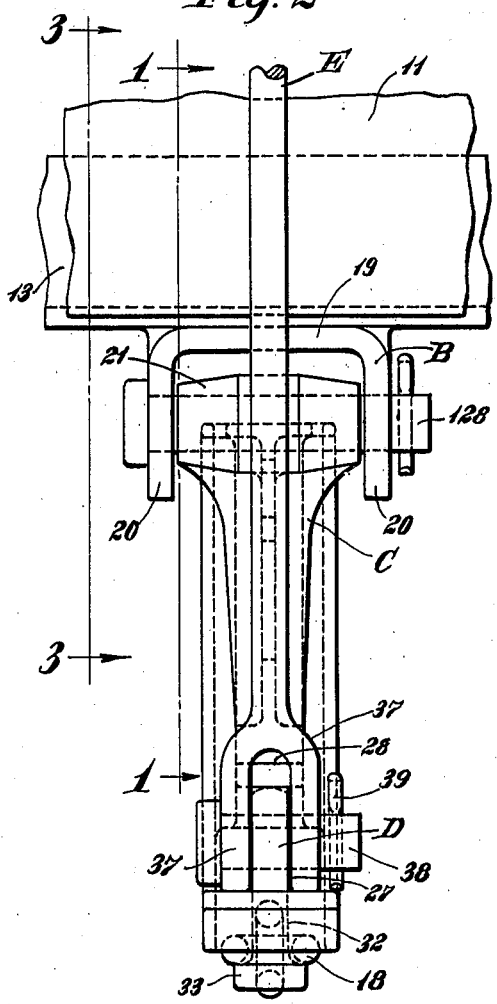
Inventor
George E. Dath
By Henry Fuchs.
Atty.

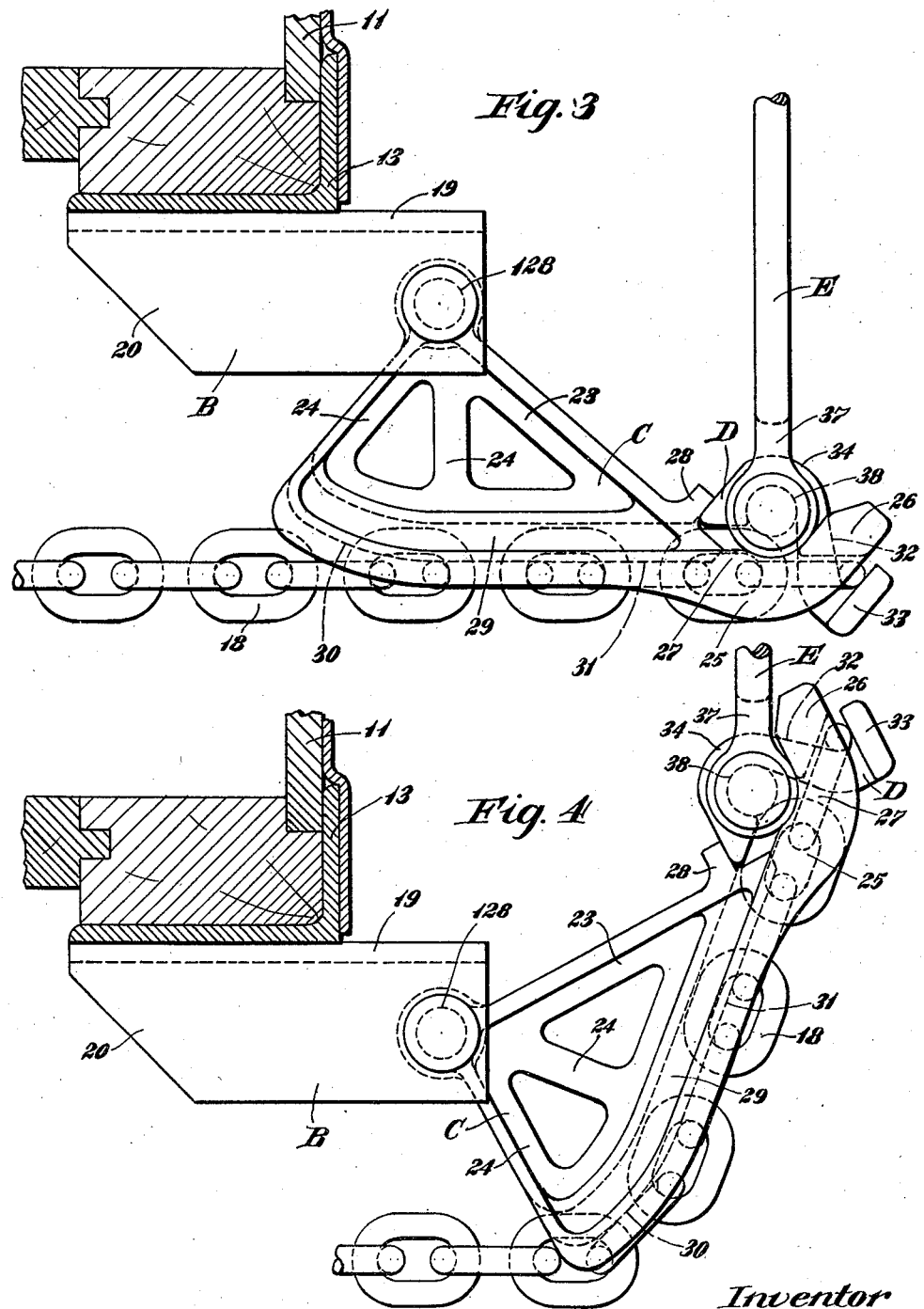

Patented May 2, 1944

2,347,889

UNITED STATES PATENT OFFICE 2,347,889

QUICK TAKE-UP MECHANISM

George E. Dath, Mokena, Ill., assignor to W. H. Miner, Inc., Chicago, Ill., a corporation of Delaware Application September 10, 1942, Serial No. 457,832

4 Claims. (Cl. 74—517)

This invention relates to improvements in quick take-up mechanism for hand brakes for railway cars, and more particularly to quick take-up mechanism in the form of a bell crank means.

One object of the invention is to provide in a bell crank means, especially designed to provide for quick take-up of the brake chain during the initial application of the brakes, followed by transmission of high power during the final application of the brakes, simple and efficient anchoring means for both the pull-up member of the hand brake mechanism proper, and the horizontal brake chain of the car.

A more specific object of the invention is to provide in a bell crank means of the character specified in the preceding paragraph an anchoring member which serves to anchor both the horizontal brake chain of the car and the pull-up rod of the hand brake mechanism proper to the bell crank proper of the bell crank means in such a manner that the points of connection of the chain and pull-up member may be placed very close to each other on the bell crank without sacrificing the strength of the bell crank structure where these connections are made.

Other objects of the invention will more clearly appear from the description and claims hereinafter following.

In the drawings forming a part of this specification, Figure 1 is a vertical, longitudinal, sectional view through the end portion of a railway car, illustrating my improvements in connection therewith, said view being partly broken and showing the hand brake mechanism proper, bell crank, and horizontal chain in side elevation. Figure 2 is an elevational view, looking from right to left in Figure 1, on an enlarged scale, of the mechanism at the bottom of Figure 1. Figures 3 and 4 are vertical, sectional views, corresponding to the line 3—3 of Figure 2, showing the parts in different positions assumed during operation of the brakes.

In said drawings, 10 indicates the end portion of a railway car, having a vertical end wall 11 on which is mounted the usual platform 12 for the brakeman. The end sill of the car is indicated by 13.

My improved quick take-up mechanism is herein illustrated in connection with a power multiplying hand brake mechanism A of well-known type, comprising a worm driven winding element for the brake chain, as shown in patents, Nos. 1,974,581 and 1,854,804. The chain winding element and associated mechanism of the hand brake A are contained in a housing 14 secured to the end wall of the car and said mechanism is actuated by the usual hand wheel 15, as disclosed in the patents hereinbefore referred to. The worm operated actuating means is connected to the winding element by a lever operated clutch means. In the brake illustrated herein, the clutch operating lever is indicated by 16. The winding element of the power multiplying brake mechanism A has a chain section 17 connected thereto, said section being wound on said element when the hand wheel 15 is rotated in brake tightening direction and being unwound therefrom when the hand wheel is rotated in a reverse direction. Motion of the chain 17 is transmitted to the chain section 18 leading to the brake mechanism proper of the car through my improved quick take-up mechanism.

The improved quick take-up mechanism comprises broadly a supporting bracket B; a swinging bell crank member C pivotally supported on said bracket; an anchoring member D connected to the bell crank; and a pull-up rod E connected to the anchoring member D and actuated by the chain 17 of the hand brakes.

The supporting bracket B is of inverted U-shaped form comprising a relatively thick, horizontally disposed, platelike portion 19 provided with depending, vertically disposed, side flanges 20—20. The bracket B is secured to the underneath side of the car in any suitable manner with the upperside of the platelike portion 19 fitted flat against the bottom of the car.

The bell crank member C is preferably in the form of a casting having a hub portion 21 and a chain guide portion 22 spaced from said hub portion. The chain guide portion 22 is connected to the hub by three radial spoke members 23—24—24. As clearly shown in Figures 1, 3, and 4, the spoke member 23 is of considerably greater length than the spoke members 24 and 24. At the bottom end of the bell crank C, as viewed in Figure 1, is a depending extension 25 which forms a continuation of the chain guide portion 22. The extension 25 includes a horizontal portion 26, extending to the right thereof, as viewed in said Figure 1. Inwardly of the outer end of the portion 26 of the extension 25 is a vertical opening 27 which extends entirely through the same. Above the extension 25, the arm 23 of the bell crank has an outstanding lug 28, for a purpose hereinafter pointed out. The bell crank is swingingly supported at its upper end from the bracket B by a pivot pin 128 extending through the flanges 20—20 of said bracket and the hub 21.

The chain guide portion 22 presents an outwardly opening chain receiving channel 29 in which the links of the chain 18 seat as the latter is wound on the guide portion 22 of the bell crank. The upper end portion of the chain guide, which portion is indicated by 30, is curved, as shown, and that portion of the chain guide between the portion 30 and the depending extension 25 is substantially straight. This straight portion is indicated by 31.

Referring to the position of the parts shown in Figure 1, the anchoring member D is in the form of a hook, having a depending shank 32 provided with an outstanding, horizontal flange 33 at the lower end forming a head. The flange 33 does not extend completely around the shank, projecting only from opposite sides of the latter and to the right thereof, as illustrated in Figure 1. The lower end portion of the shank 32 is offset to the left with respect to the hook portion proper 34 of the anchoring member D, as shown in said Figure 1, and the upper edge of the portion 34 is formed substantially flat to truly engage with the underneath side of the lug 28 of the bell crank C. The pull-up rod E is connected at its upper end to the chain 17 by a clevis 35, to which the rod is secured by a rivet 36 extending through the arms of the clevis and an eye formed at the upper end of said rod. At the lower end the rod E is forked, as indicated at 37, to receive the hook portion 34 of the anchoring member D.

As will be seen upon reference to Figures 1, 2, 3, and 4, the shank 32 of the anchoring member D is engaged through the end link of the chain 18 and extends through the opening 27 of the bell crank C, and the hook portion 34 of the member D is secured to the rod E by means of a pivot pin 38 embraced by said hook portion and extending through aligned openings in the arms of the forked portion 37 of the rod E. The pin 38 is preferably secured against accidental removal by a cotter 39. As will be evident when the parts are assembled the anchoring member D is held in position on the bell crank C by the fork 37 of the rod E to which it is locked by the pin 38 and the lug 28 of the bell crank, the fork resting on the portion 26 of the extension 25 of the bell crank, and the hook portion 34 of the anchoring member D being seated against the lug 28.

In attaching the pull-up rod E and the chain 18 to the bell crank C, the anchoring member D is first connected to the chain 18 by passing the hook and shank portion thereof upwardly through the opening of the end link thereof until arrested by the flange 33. In order to permit threading of the hook portion 34 through the end link thereof, the anchoring member must be rotated through 180° from the position shown in Figure 1. After it has been connected to the chain 18, as hereinbefore described, the anchoring member is rotated back to the position shown in said figure and the hook and shank thereof is then passed upwardly through the opening 27 of the bell crank, lifting the chain therewith, until the hook strikes the lug 28. The pull-up rod E is then secured to the hooked end of the member D by means of the pin 38, the same being engaged through the openings of the arms of the fork of the rod E and the opening of the hook.

As will be evident, the anchoring member provides for a rugged connection between the bell crank and pull-up rod chain 18 without in any way weakening the structure of the bell crank at the zone of connection.

In the operation of applying the brakes, the chain 17 is forcibly pulled upwardly by the power multiplying means of the brake mechanism A, thereby pulling upwardly on the rod E and swinging the bell crank member C outwardly or in a contraclockwise direction, as viewed in Figure 1. During the initial upward movement of the rod E, the bell crank is swung from the position shown in Figure 1 to that shown in Figure 3, thus quickly taking up the slack in the chain 18, the effective lever arm from the pivot 128 of the bell crank to the point of connection of the rod E with the crank being relatively short, while the effective length of the arm from the pivot 128 to the point of connection of the chain is relatively long. The quick take-up is thus produced by a relatively small upward movement of the rod E. As the application of the brakes continues the parts move from the position shown in Figure 3 approximately to that shown in Figure 4 when the brakes are fully set. The power transmitted to the chain 18 during this last named action is relatively great due to the relative effective lengths of the two lever arms of the bell crank, the effective lever arm from the pivot 128 to the point of connection of the rod E being greater than the effective length of the arm from the pivot 128 to the point of connection of the chain. The final application of the brakes is thus effected with great force, the force applied to the chain 18 being considerably greater than that transmitted by the power multiplying hand brake mechanism A.

When the brakes are released by the chain 17 being unwound from the winding mechanism of the brake A, the bell crank member C, due to the pull of the chain 18, swings in clockwise direction, as viewed in Figure 4, from approximately the position shown in this figure through the position shown in Figure 3 to that shown in Figure 1.

I have herein shown and described what I now consider the preferred manner of carrying out my invention, but the same is merely illustrative, and I contemplate all changes and modifications that come within the scope of the claims appended hereto.

I claim:

1. In a quick take-up mechanism for hand brakes for cars, the combination with a bell crank swingingly supported underneath the car; of a short arm projecting from said bell crank, said arm having an opening therethrough; a horizontal brake chain leading to the brake mechanism proper of the car; a vertical pull-up rod for actuating the bell crank; and an anchoring member attached to the bell crank, said anchoring member having a shank portion extending through the opening of said arm, the lower end of said shank portion extending through the end link of said chain and having a flange thereon preventing disengagement of said link from said shank portion, the upper end of said anchoring member being pivotally secured to the lower end of said pull-up rod.

2. In a quick take-up mechanism for hand brakes for cars, the combination with a bell crank swingingly supported underneath the car; of a short arm projecting outwardly from the bell crank, said arm having an opening therethrough; a horizontal brake chain leading to the brake mechanism proper of the car; a vertical pull-up rod for actuating said bell crank; and an anchoring member having a shank provided with a head at the lower end thereof and having a hook portion at the upper end in hooked engagement with the pull-up rod, said shank extending through the opening of said arm and the end link of the chain, said end link being confined between the head of said shank and the lower edge of said arm.

3. In a quick take-up mechanism for hand brakes for cars, the combination with a bell crank swingingly supported underneath the car; of a short arm projecting outwardly from said bell crank, said arm having an opening therethrough; a horizontal chain leading to the brake mechanism proper of the car; a vertical pull-up rod for actuating said bell crank, said pull-up rod having a forked lower end; a pivot pin extending through the forked end; and an anchoring member having a shank provided with a head at one end and a hook at the other end, said shank extending upwardly through the end link of the chain and the opening of said arm, the hook of said anchoring member being engaged between the branches of the forked end of said pull-up rod in hooked engagement with said pivot pin, and the head of said anchoring member being shouldered against said end link of the chain to prevent detachment of said end link from the anchoring member.

4. In a quick take-up mechanism for hand brakes for cars, the combination with a bell crank swingingly supported underneath the car, said bell crank having a long arm and a short arm; of a straight chain guide extending from said long arm toward said short arm; a lug projecting outwardly from the bell crank at the outer end of said long arm in a direction away from the corresponding end of said chain guide, said chain guide having a curved portion of short radius at the other end thereof; a horizontal chain leading to the brake mechanism proper of the car; a vertical pull-up rod; and an anchoring member secured to said lug, said anchoring member having said chain and pull-up rod secured thereto at opposite ends thereof.

GEORGE E. DATH.